(12) United States Patent
Franchuk et al.

(10) Patent No.: US 7,694,061 B2
(45) Date of Patent: Apr. 6, 2010

(54) DISCARDING A PARTIALLY RECEIVED MESSAGE FROM A DATA QUEUE

(75) Inventors: Brian A. Franchuk, Richfield, MN (US); Roger R. Benson, Eden Prairie, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 217 days.

(21) Appl. No.: 10/936,142

(22) Filed: Sep. 8, 2004

(65) Prior Publication Data

US 2006/0070079 A1 Mar. 30, 2006

(51) Int. Cl.
*G06F 13/36* (2006.01)
(52) U.S. Cl. ............................ 710/310; 710/52; 710/106
(58) Field of Classification Search ................. 710/310, 710/52, 106
See application file for complete search history.

(56) References Cited

U.S. PATENT DOCUMENTS

| | | | | |
|---|---|---|---|---|
| 4,507,760 A | * | 3/1985 | Fraser | 365/221 |
| 4,682,284 A | * | 7/1987 | Schrofer | 710/55 |
| 5,016,221 A | * | 5/1991 | Hamstra | 365/221 |
| 5,485,572 A | * | 1/1996 | Overley | 714/21 |
| 5,533,034 A | * | 7/1996 | Kuwata et al. | 714/748 |
| 5,850,570 A | * | 12/1998 | Shoji | 710/24 |
| 5,860,119 A | * | 1/1999 | Dockser | 711/156 |
| 6,219,728 B1 | * | 4/2001 | Yin | 710/52 |
| 6,307,860 B1 | * | 10/2001 | Joffe et al. | 370/412 |
| 6,327,615 B1 | * | 12/2001 | Kasper | 709/213 |
| 6,385,672 B1 | * | 5/2002 | Wang et al. | 710/56 |
| 6,496,885 B1 | * | 12/2002 | Smart et al. | 710/100 |
| 6,564,268 B1 | | 5/2003 | Davis et al. | |
| 6,799,229 B1 | * | 9/2004 | Lin | 710/52 |
| 2004/0039877 A1 | * | 2/2004 | Imai et al. | 711/118 |

\* cited by examiner

*Primary Examiner*—Mark Rinehart
*Assistant Examiner*—Nimesh G Patel
(74) *Attorney, Agent, or Firm*—Kinney & Lange, P.A.

(57) ABSTRACT

Devices in a process control system communicate by data messages over a communication medium segment. Each device includes a communication controller that includes a received data memory and a plurality of received message objects. When a message is received, a received message object is activated, and the initial position of a write pointer in the received data memory is stored in the received message object. During message reception, if a hardware device determines that the message is to be ignored, the received message object is deactivated, thereby preventing further writing of the message to the received data memory. The write pointer is then preferably returned to its initial position as stored in the received message object.

11 Claims, 5 Drawing Sheets

DISCARDING A PARTIALLY RECEIVED MESSAGE FROM A DATA QUEUE

BACKGROUND OF THE INVENTION

The present invention relates to a communications controller for use in field instruments and other devices of process control systems. In particular, the present invention is a system and method for discarding a partially received message from a received data memory.

In a typical industrial plant, a distributed control system (DCS) is used to control many of the industrial processes performed at the plant. Typically, the plant has a centralized control room having a computer system with user I/O, disc I/O, and other peripherals as are known in the computing art. Coupled to the computing system are a controller and a process I/O subsystem.

The process I/O subsystem includes a plurality of I/O ports which are connected to various field devices throughout the plant. Field devices known in the control art include various types of analytical equipment, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, and indicator lights. As used herein, the term "field device" encompasses these devices, as well as any other device that performs a function in a distributed control system and is known in the control art.

Traditionally, analog field devices have been connected to the control room by two-wire twisted pair current loops, with each device connected to the control room by a single two-wire twisted pair. Analog field devices are capable of responding to or transmitting an electrical signal within a specified range. In a typical configuration, it is common to have a voltage differential of approximately 20-25 volts between the two wires of the pair and a current of 4-20 milliamps running through the loop. An analog field device that transmits a signal to the control room modulates the current running through the current loop, with the current proportional to the sensed process variable. On the other hand, an analog field device that performs an action under control of the control room is controlled by the magnitude of the current through the loop, which is modulated by the I/O port of the process I/O system, which in turn is controlled by the controller. Traditional two-wire analog devices having active electronics can also receive up to 40 milliwatts of power from the loop. Analog field devices requiring more power are typically connected to the control room using four wires, with two of the wires delivering power to the device. Such devices are known in the art as four-wire devices and are not power limited, as are two-wire devices.

In contrast, traditional discrete field devices transmit or respond to a binary signal. Typically, discrete field devices operate with a 24-volt signal (either AC or DC), a 110- or 240-volt AC signal, or a 5-volt DC signal. Of course, a discrete device may be designed to operate in accordance with any electrical specification required by a particular control environment. A discrete input field device is simply a switch which either makes or breaks the connection to the control room, while a discrete output field device will take an action based on the presence or absence of a signal from the control room.

Historically, most traditional field devices have had either a single input or a single output that was directly related to the primary function performed by the field device. For example, the only function implemented by a traditional analog resistive temperature sensor is to transmit a temperature by modulating the current flowing through the two-wire twisted pair, while the only function implemented by a traditional analog valve positioner is to position a valve between an open and closed position, inclusive, based on the magnitude of the current flowing through the two-wire twisted pair.

More recently, hybrid systems that superimpose digital data on the current loop have been used in distributed control systems. One hybrid system is known in the control art as the Highway Addressable Remote Transducer (HART) and is similar to the Bell 202 modem specification. The HART system uses the magnitude of the current in the current loop to sense a process variable (as in the traditional system), but also superimposes a digital carrier signal upon the current loop signal. The carrier signal is relatively slow, and can provide updates of a secondary process variable at a rate of approximately 2-3 updates per second. Generally, the digital carrier signal is used to send secondary and diagnostic information and is not used to realize the primary control function of the field device. Examples of information provided over the carrier signal include secondary process variables, diagnostic information (including sensor diagnostics, device diagnostics, wiring diagnostics, and process diagnostics), operating temperatures, temperature of the sensor, calibration information, device ID numbers, materials of construction, configuration or programming information, etc. Accordingly, a single hybrid field device may have a variety of input and output variables and may implement a variety of functions.

HART is an industry standard nonproprietary system. However, it is relatively slow. Other companies in the industry have developed proprietary digital transmission schemes which are faster, but these schemes are generally not used by or available to competitors.

More recently, a newer control protocol has been defined by the Instrument Society of America (ISA). The new protocol is generally referred to as fieldbus. Fieldbus is a multi-drop serial digital two-way communications protocol intended for connecting field instruments and other process devices such as monitoring and simulation units in distributed control systems. Fieldbus allows enhanced digital communication over previous process control loop methods while maintaining the ability to power process devices coupled to the fieldbus loop and while meeting intrinsic safety requirements.

Two reasonably standardized industrial fieldbus protocols are Foundation Fieldbus and Profibus. The physical layer of the fieldbus protocols are defined by Instrument Society of America standard ISA-S50.02-1992, and its draft two extension dated 1995. The fieldbus protocol defines two subprotocols. An H1 fieldbus network transmits data at a rate up to 31.25 kilobits per second (Kbps) and provides power to field devices coupled to the network. The H1 physical layer subprotocol is defined in Clause 11 of the ISA standard, part two approved in September 1992. An H2 fieldbus network transmits data at a rate up to 2.5 megabits per second (Mbps), does not provide power to field devices connected to the network, and is provided with redundant transmission media.

Fieldbus provides significant capabilities for digitally communicating immense amounts of process data. Thus, there is a continuing need to develop process control devices capable of maximizing fieldbus communication effectiveness.

BRIEF SUMMARY OF THE INVENTION

The present invention is a system and method for discarding a partially received message from a data queue that is capable of storing a plurality of messages. When a message is received, an initial position of a write pointer in the data queue is stored. The received message is then written to the data queue starting at the initial position of the write pointer. As the received message is written to the data queue, a position of the write pointer is incremented. If the message is to be discarded, the write pointer is returned to the initial position such that a next message received by the communication device overwrites the received message.

In a preferred embodiment, the data queue is stored in a received data memory in a communication controller. The communication controller also includes a plurality of received message objects. When a message is received, a received message object is activated, and the initial position of a write pointer in the received data memory is stored in the active received message object. The received message is then written to the received data memory starting at the initial position of the write pointer. As the message is written to the received data memory, the write pointer position is incremented. If a hardware device determines that the message is to be ignored, the active received message object is disabled, thereby preventing further writing of the message to the received data memory. The write pointer is then preferably returned to its initial position as stored in the received message object.

DETAILED DESCRIPTION

Process Control System Overview

The present invention relates to a communication controller for use in field instruments and other devices of process control systems. The purpose of the communication controller is to perform a substantial portion of the link layer processing of messages and timer management, thereby freeing the application processor or CPU to perform other functions. For the purpose of this detailed description, the communication controller will be described in the context of a system using the Foundation Fieldbus communications protocol, although it has general applicability to packet-based communication protocols.

The fieldbus physical layer defines the electrical characteristics of the physical means of transmission and reception of the communications protocol data in the form of a Physical Layer Protocol Data Unit (PhPDU). In addition, the fieldbus physical layer specifies the symbol encoding, message framing, and error detection method. The ISA fieldbus standard defines three signaling speeds and two modes of coupling. For purposes of this description, the invention will be described in the context of the H1 physical layer defined in clause 11 of ISA S50.02 Standard, Part 2. That clause covers a 31.25 Kbps, voltage mode, wire medium, with a low-power option. This option allows for a device connected to the communications medium to receive its operational power from the communications medium. The physical layer can be capable of meeting the intrinsic safety requirements for hazardous environments. The protocol operates on low-grade twisted pair cable and supports multiple devices, in accordance with the voltage and current limitations which are defined by the standard.

Figure 1:
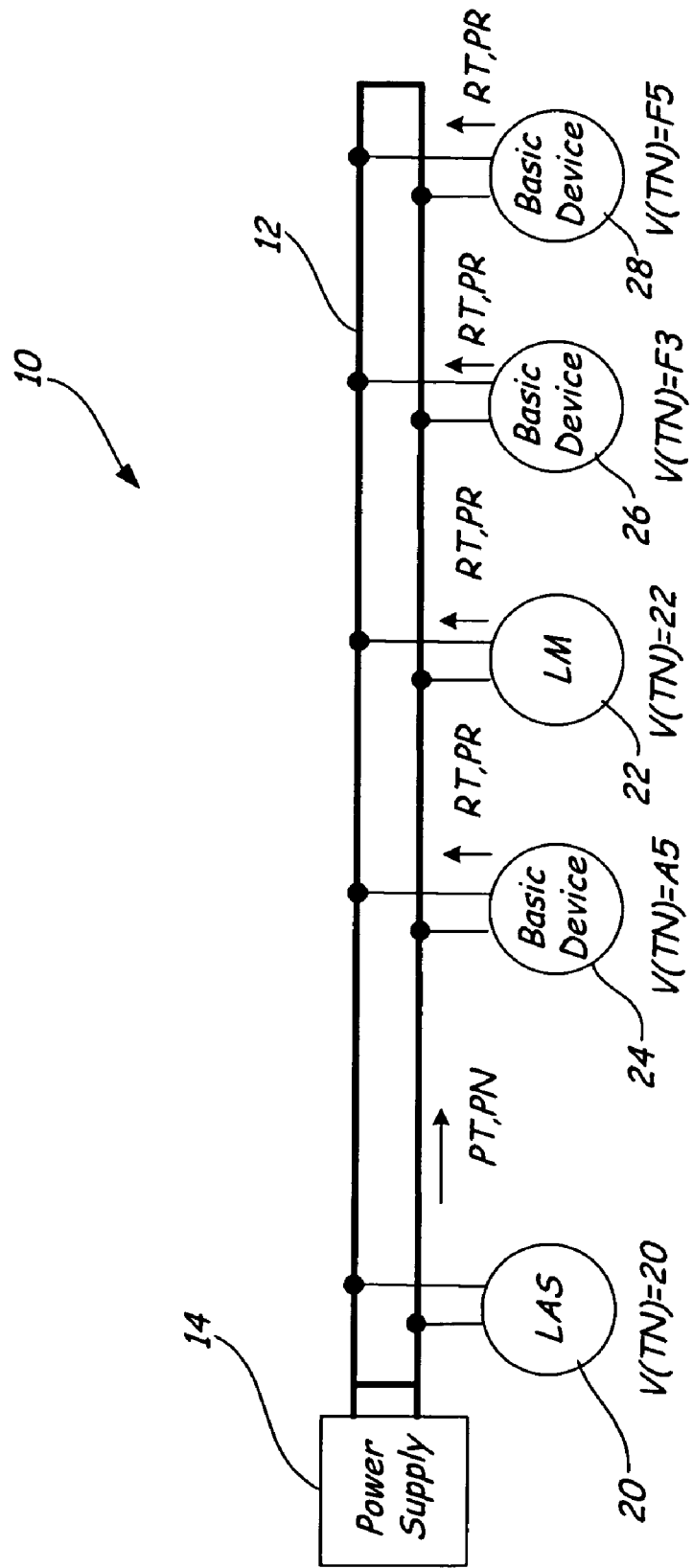
FIG. 1 is a diagram of a process control system with digital communication between devices over a communication medium segment.

FIG. 1 shows a typical process control system 10 including segment 12, power supply 14 and five devices: Link Active Scheduler (LAS) device 20, Link Master (LM) device 22, and basic devices 24, 26, and 28. Segment 12 can support up to thirty-two devices on a single pair of wires. Typically, segment 12 will have from four to sixteen devices, based on loop execution speed, power, and intrinsic safety requirements.

LAS device 20 maintains a central schedule for all the communication between devices on segment 12. LAS device 20 improves the overall communication reliability by sending Compel Data (CD) Data Link Protocol Data Units (DLPDUs) to each device to transmit back cyclic data which is then scheduled to do so. LAS device 20 serves as the local source of Data Link time (DL-time) on segment 12. A DLPDU is the data content of the PhPDU message that is communicated across segment 12.

LM device 22 is configured to take over the responsibilities of LAS device 20 should LAS device 20 fail or become inoperable. Although only LM device 22 is shown in FIG. 1, more than one Link Master device can be present on a segment. This allows for the case if both the Link Active Scheduler and the first Link Master were to fail, then the second Link Master can take over for the Link Active Scheduler. Once the Link Active Scheduler is disabled, the Link Master takes over the functionality of the Link Active Scheduler.

Each device has a unique address called the V(TN), which represents the local node-ID (This_Node). In the example shown in FIG. 1, LAS device 20 has an address V(TN)=20; LM device 22 has address V(TN)=22; basic device 24 has address V(TN)=A5; basic device 26 has address V(TN)=F3; and basic device 28 has address V(TN)=F5.

LAS device 20 sends Pass Token (PT) and Probe Node (PN) messages to all devices on segment 12. Each of the other devices (LAS device 22 and basic devices 24, 26, 28) send Return Token (RT) and Probe Response (PR) messages back to LAS device 20, as appropriate.

Each basic device 24, 26, 28 only needs to see its own PT and PN messages that are sent by LAS device 20. PT and PN messages have a designation address (DA) encoded in the second byte of the DLPDU. LAS device 20 passes a token (PT) or probes a node (PN) one at a time to all devices on segment 12.

Once basic device 24, 26, or 28 receives a PT message with a designation address equal to that device's unique address (DA=V(TN)), it then will respond back to LAS device 20 with an RT message. If basic device 24, 26, or 28 receives a PN DLPDU with DA=V(TN), it is required to respond back with a PR message.

The transmission of PT and PN messages from LAS 20 and RT and PR messages to LAS 20 creates several messages on segment 12 that a particular basic device 24, 26, 28 does not need to receive and take action on. Each basic device 24, 26, 28 only needs to respond to PT and PN messages addressed to that particular device. Constantly getting interrupted by PT and PN messages from LAS 20 that are addressed to other devices, as well as RT and PR messages from other devices addressed to LAS device 20, can create undue processing time to handle these "nuisance interrupts." With basic devices 24, 26, and 28, DLPDU filtering can be used to reduce the number of interrupts that the basic device has to process. On the other hand, LAS device 20 must process every message on segment 12.

All devices on segment 12 transmit data onto segment 12 as a Manchester encoded baseband signal. With Manchester encoding, "0" and "1" are represented by transitions that occur from low-to-high and high-to-low, respectively, in the middle of the bit period. For fieldbus, the nominal bit time is 32 microseconds (μsec), with the transition occurring at 16 μsec. The Manchester encoding rules have been extended to include two additional symbols, non-data plus (N+) and non-data minus (N−), wherein no transition occurs during the bit period and the Manchester encoded baseband signal remains high (N+) or low (N−).

Message Format

Figure 2:
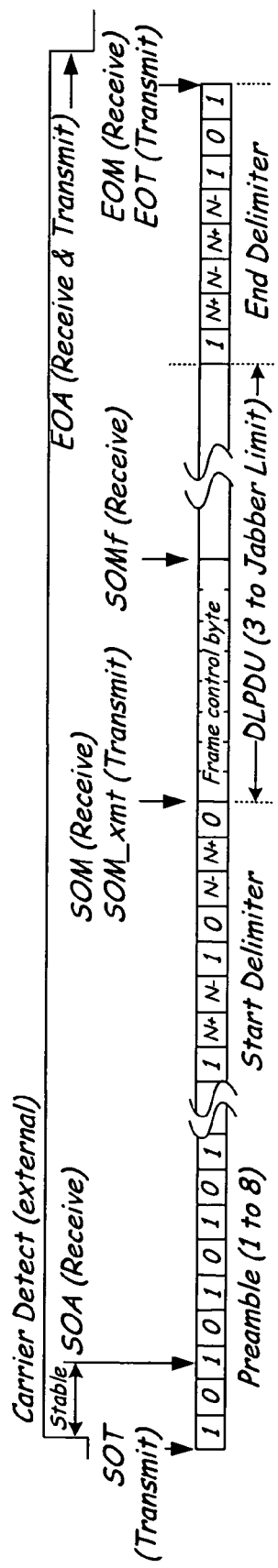
FIG. 2 shows a message format for communications between devices of the process control system of FIG. 1.

FIG. 2 shows the format of a Physical Layer Protocol Data Unit (PhPDU) used to transmit messages over segment 12. The PhPDU includes a preamble, a Start Delimiter (SD) a Data Link Protocol Data Unit (DLPDU) and an End Delimiter (ED). The preamble is the first several bits of the PhPDU message. The fieldbus specification allows for one to eight bytes of preamble. The device receiving the message uses the preamble to synchronize with the incoming message. As shown in FIG. 2, the sequence of the first byte of the preamble is 1 0 1 0 1 0 1 0.

The Start Delimiter (SD) immediately follows the preamble. There is one SD per message. The fieldbus specification requires that the SD have non-character data (N+ and N−), which always appear in the SD message in complementary pairs. This encoding scheme makes the SD unique and impossible to confuse with the data portion (DLPDU) of the message. The sequence shown in FIG. 2 for the SD is 1 N+ N− 1 0 N− N+ 0.

The DLPDU is a variable length message. It contains a Frame Control (FC) byte as its first byte and a Frame Check Sequence (FCS) check sum as its final two bytes. The length of DLPDU is variable, with a minimum of three bytes (in the case of an RT message) up to a jabber limit of, for example, about 300 bytes.

The End Delimiter (ED) follows the DLPDU. It represents the last byte of any PhPDU message transmitted over segment 12. Similar to the SD, the ED includes non-character data in complementary pairs. This encoding scheme makes the ED unique and impossible to confuse with the DLPDU. The sequence shown in FIG. 2 for the End Delimiter is 1 N+ N− N+ N− 1 0 1.

FIG. 2 also shows a Carrier Detect signal. The purpose of the Carrier Detect signal is to indicate when (a) an incoming PhPDU message is present on segment 12 or (b) a device is transmitting a message onto segment 12.

Start of Transmit (SOT) occurs at the moment that a Transmit Enable (TxE) goes active, i.e., when the preamble of a PhPDU message is first presented to segment 12.

Start of Activity (SOA) occurs after the Carrier Detect signal goes active and has been stable for at least one bit time or two bit times (approximately 16 to 32 μsec). This time depends on when the Carrier Detect goes active with respect to the internal clock of the device receiving the message. This allows the communication controller of the device to ignore noise glitches that are most apt to occur at the front end of the preamble. Additional time is used to synchronize with the bit boundaries to eliminate the potential for short noise bursts on segment 12 being misinterpreted as activity. For a transmitted message, SOA occurs once the Transmit Enable goes active (i.e., the preamble of the PhPDU is presented to segment 12).

Start of Message (SOM) occurs at the beginning of the first bit of when the FC byte is detected for a received message.

SOM_xmt is the Start of Message Transmit, which occurs at the beginning of the first bit of when the FC byte is detected for a transmitted message.

SOMf is an SOM of a received filtered DLPDU. This occurs when the communication controller within the device has detected enough information to make the determination that the incoming message is to be filtered.

End of Message (EOM) occurs at the end of the last bit of the ED being encountered in a received message. End of Transmission (EOT) occurs at the end of the last bit of the ED a transmitted message.

End of Activity (EOA) occurs when the Carrier Detect has gone inactive. The EOA occurs for both transmitted and received DLPDUs.

Device Architecture

Figure 3:
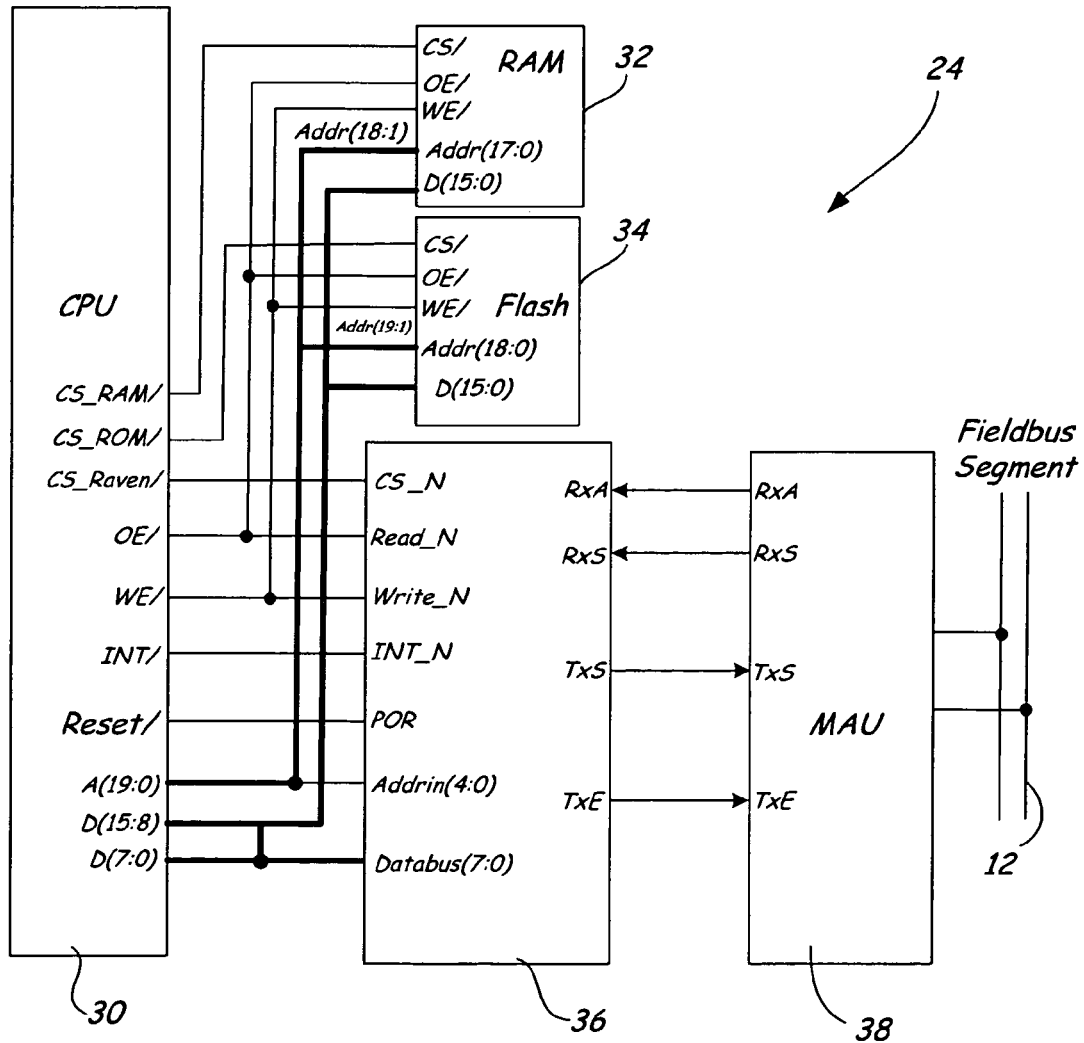
FIG. 3 is a block diagram of a device of the process control system.

FIG. 3 shows a block diagram of the communications portion of basic device 24, which is representative of the architecture in each of devices 20-28. Basic device 24 includes central processing unit (CPU) 30, random access memory (RAM) 32, flash memory 34, communications controller 36, and medium attachment unit (MAU) 38.

In the embodiment shown in FIG. 3, CPU 30 is a microprocessor such as Motorola 68LC302, Motorola Mcore 2075, Motorola PowerPC 850, Atmel Thumb processor AT91M40800 and others. CPU 30 is an 8-bit or higher processor.

In the embodiment shown in FIG. 3, communication controller 36 is an application specific integrated circuit (ASIC) chip that serves as an interface between MAU 38 and CPU 30. It transmits and receives encoded Manchester data to and from external analog circuitry connected to fieldbus segment 12. After receiving the serial data from MAU 38, communication controller 36 decodes the data, forms the data into bytes, strips off the preamble, SD, and ED, (and, optionally, the FCS bytes) and provides the message data for the link layer to read. For data transmission, communication controller 36 receives bytes of DLPDU data from the link layer and adds the preamble, the SD, optionally generates the FCS, and adds the ED. Communication controller 36 then forms serially encoded Manchester data, which is sent to MAU 38 for transmission on fieldbus segment 12.

Communication between communication controller 36 and MAU 38 is provided through four signals: RxS, RxA, TxS, and TxE. RxS is the received Manchester Encoded serial data. RxA is the Carrier Detect signal for received data. TxS is the transmitted encoded serial data. TxE is the transmit enable signal.

In other embodiments of the invention, communication controller 36 can be formed on a common integrated circuit with CPU 30. In addition, RAM 32 and flash memory 34 may also be combined with CPU 30 in some embodiments. In the case of LAS device 20, CPU 30, RAM 32 and flash memory 34 may be a part of a host computer system of process control system 10.

MAU 38 provides the network connection to Fieldbus segment 12. MAU 38 may be an integrated circuit, or discrete components can be used to form MAU 38.

Communication Controller 36

Figure 4:
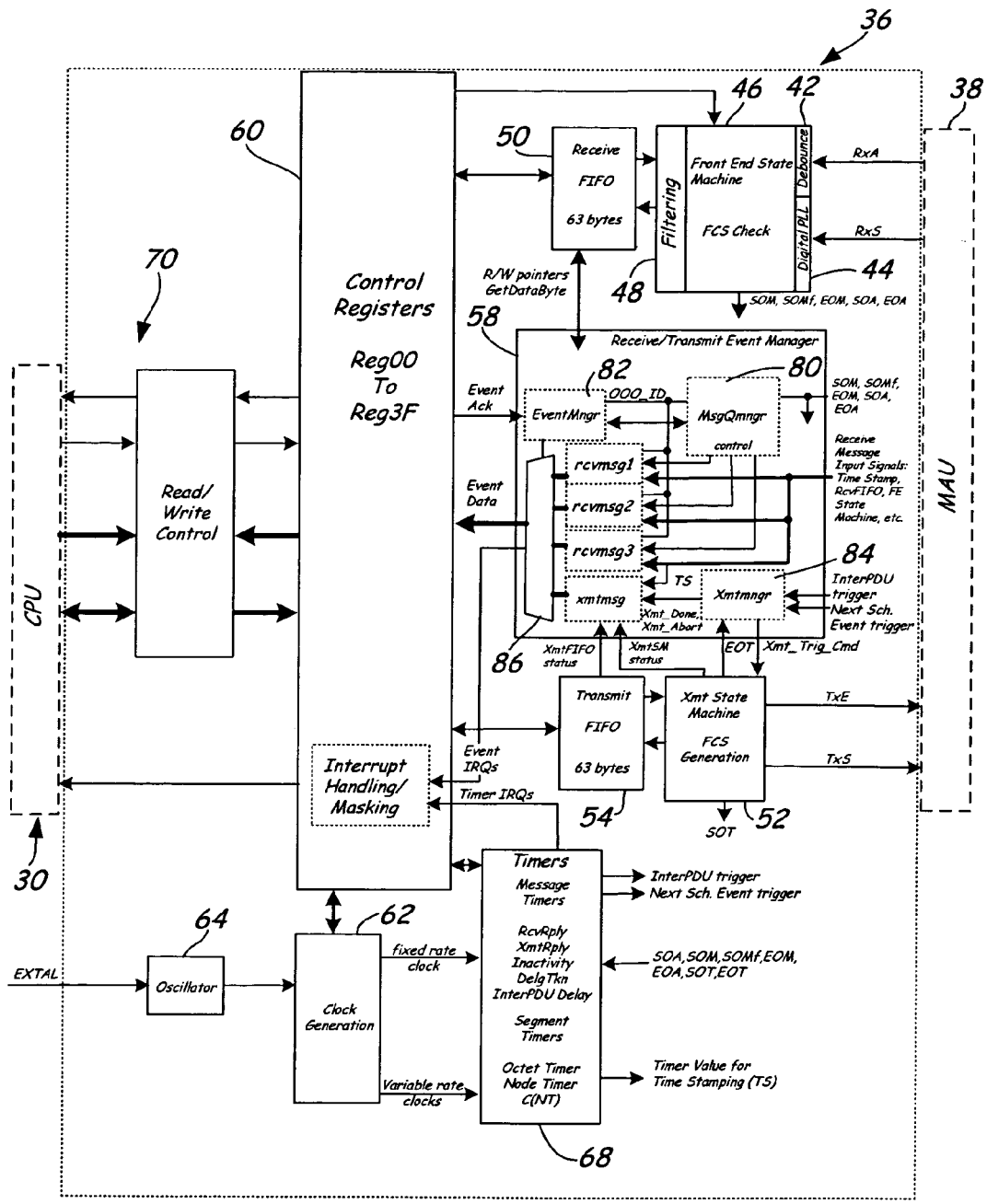
FIG. 4 is a functional block diagram of a communication controller of the device of FIG. 3.

FIG. 4 is a functional block diagram of communication controller 36. In this embodiment, communication controller 36 includes debounce circuit 42, digital phase lock loop (PLL) 44, front end state machine 46, receive message filtering 48, receive first-in-first-out (FIFO) memory 50, transmit state machine 52, transmit FIFO memory 54, transmit driver circuitry 56, receive/transmit event manager 58, registers 60, clock generation circuitry 62, oscillator 64, timers 68, and CPU interface circuitry 70.

When an incoming message is detected by MAU 38, a Carrier Detect signal is provided to communication controller 36 at the RxA input, and the incoming asynchronized Manchester data is provided at the RxS input. The RxA and RxS inputs are presented to front end state machine 46. Digital PLL 44 recovers and regenerates the clock from the incoming serial Manchester encoded data. This regenerated clock is then used to clock front end state machine 46.

Front end state machine 46 detects the incoming serial bit stream RxS. It strips off the preamble, SD, and ED, and stores the DLPDU into receive FIFO memory 50. Front end state machine 46, together with receive message filtering 48, can be configured to filter out specific frame controls, plus Probe Node (PN) and Pass Token (PT) messages addressed to other devices. Front end state machine 46 keeps track of the number of bytes that have been written into receive FIFO memory 50. The FCS is automatically verified at the end of each message, and can be optionally stored into receive FIFO memory 50.

Front end state machine 46 also provides signals representing specific events it has detected. These include the SOM, SOMf, EOM, SOA, and EOA event pulses.

Front end state machine 46 is activated when the RxA line goes active. Front end state machine 46 then synchronizes with the edges of the preamble field and decodes the Manchester encoded data of the RxS signal. The SOA event indicates that front end state machine 46 has started.

Once the preamble has been detected, front end state machine 46 waits for the Start Delimiter (SD) sequence. After the SD has been detected, front end state machine 46 converts the serial data stream into octets, and writes them to receive FIFO memory 50 in 8-bit bytes. Front end state machine 46 continues writing new octets of data into receive FIFO memory 50 until the End Delimiter (ED) is detected, or until receive FIFO memory 50 is full.

When the ED has been detected, front end state machine 46 waits for the RxA line to go inactive, which is indicated by the EOA event.

With the RxA line inactive, front end state machine 46 returns to its initial state. It remains in that initial state until the next activity on fieldbus segment 12 (i.e., until a Carrier Detect signal is provided at RxA again).

Filtering circuitry is used for basic devices, to reduce IRQ loading on messages that are not important to the device. In contrast, a device configured as an LAS must receive all messages on the segment and therefore must have filtering disabled. When filtering is disabled, all received messages will be stored in receive FIFO memory 50 and will be passed on to registers 60 and then to CPU 30. SOMf is a Start Of Message signal for a received filtered DLPDU. It occurs when front end state machine 46 has determined that the received message has detected enough information to determine that the incoming message is to be filtered.

With filtering enabled, messages that are filtered are not stored in received FIFO memory 50. For filtered messages, SOMf will not be generated, therefore no event or IRQ will occur.

Examples of filtered messages are Return Token (RT), idle, Request Interval (RI) and Probe Response (PR) DLPDU messages will always be rejected. These are identified based upon the Frame Control (FC) byte. Pass Token (PT) and Probe Node (PN) messages will be accepted if the destination address in the message matches the address for the device. If the destination address does not match, then the PT and PN messages are rejected.

The ability to filter message types based on the FC byte and based upon the destination address reduces the software interrupt loading by limiting the number of interrupt requests (IRQs) that CPU 30 must process.

Front end state machine 46 and receive FIFO memory 50 are used to parse the serial data frames from MAU 38. CPU 30 reads the data from receive FIFO memory 50 and places it in its local memory space to decode the received DLPDU.

Receive FIFO memory 50 is 63 bytes by eight bits wide. Receive FIFO memory 50 will store all of the DLPDU bytes up to three complete received messages (up to a total of 63 bytes). Front end state machine 46 decodes the serial data stream from the filtered RxS signal, and converts it to an 8-bit parallel formatted byte. After the formation of the byte, front end state machine 46 creates a write pulse that stores the coded data into the location that is pointed to by a write pointer. After the write operation is complete, the write pointer is incremented to store the next DLPDU byte.

CPU 30 interfaces with a read pointer to receive FIFO memory 50. Any read from the receive FIFO register of registers 60 (which contains the actual DLPDU data) places the 8-bit data from receive FIFO memory 50 immediately onto the data bus for reading by CPU 30. After the read operation is complete, the read pointer is incremented. This can be continued until receive FIFO memory 50 is empty.

To prevent an overflow condition from occurring in receive FIFO memory 50, there is a register within registers 60 that allows an IRQ to be generated if receive FIFO memory 50 is approaching a full condition. The threshold for generating the IRQ is configurable.

Transmit state machine 52 reads the DLPDU data to be transmitted from transmit FIFO memory 54. The preamble, SD, and ED are automatically inserted. To start transmit state machine 52, the interPDU trigger or, optionally, the Next Scheduled Event trigger needs to be activated to commence the transmit operation. Transmit state machine 52 keeps track of the number of bytes that have been transmitted. An error status will be indicated if there is an underflow or transmitted count violation. The FCS can be optionally transmitted automatically as the last two bytes of the DLPDU.

Transmit state machine 52 encodes the Manchester serial data supplied through interface circuitry 70 on the TxS line to MAU 38 to be presented on fieldbus segment 12. Transmit state machine 52 also asserts the Transmit Enable (TxE) line at the instant that the first bit the first preamble is sent until the last bit of the ED occurs. Transmit state machine 52 also generates the Start Of Transmission (SOT) event signal when it asserts the TxE line, and generates the End Of Transmission (EOT) event signal when the TxE line returns to inactive.

Transmit FIFO memory 54 will store all of the DLPDU bytes that are required for a message to be transmitted, up to a total of 63 bytes. A configurable threshold can be set to send an IRQ telling CPU 30 when transmit FIFO memory 54 is almost empty. In that way, if more than 63 bytes are required to be transmitted, CPU 30 is notified so that it can add more data to transmit FIFO memory 54. This continues until all DLPDU bytes have been written. CPU 30 writes to transmit FIFO memory 54 using a write pointer, while transmit state machine 52 reads bytes from transmit FIFO memory 54 using a read pointer.

Communication controller 36 works on events, and must be capable of handling the occurrence of multiple events. Examples of events include an SOM, EOM, or EOA for a received message or an EOT for a transmitted message.

Receive/transmit event manager 58 manages all of the events that occur for up to a total of three received messages and one transmitted message.

As shown in FIG. 4, receive/transmit manager 58 includes three received message objects labeled rcvmsg1, rcvmsg2, and rcvmsg3, and one transmit message object labeled xmtmsg. In addition, receive/transmit manager 58 includes message queue manager (MsgQmngr) 80, event manager (EventMngr) 82, transmit manager (xmtmngr) 84, and event MUX 86.

Receive FIFO memory 50 is capable of storing the DLPDU bytes for up to three complete received messages. Each of those three messages has a corresponding object rcvmsg1, rcvmsg2, and rcvmsg3. Each object contains the status of all of the IRQs, message errors, and time stamping that occur for its corresponding received message. This information constitutes the event data for that message.

The status of all IRQs, message errors, and time stamping that occur for a transmit message are stored in the xmtmsg object. The stored information constitutes the event data for the transmitted message.

MsgQmngr 80 controls the selection and the enabling of the three received messages. Only one rcvmsg object can be active at a time. MsgQmngr 80 allows the events to be associated with the active received message. In the case of a fourth message being received before the other three messages have been acknowledged by CPU 30, MsgQmngr 80 disables any further messages from being received until the event data has been read or acknowledged.

EventMngr 82 manages the order of occurrence of events. As events occur, event manager 82 assigns each event an order of occurrence identification (OOO_ID). This allows CPU 30 to read the events one at a time as they occur. CPU 30 must acknowledge each event as it occurs. After the first event has been acknowledged, the subsequent event will be ready for CPU 30 to read.

Xmtmngr 84 monitors the InterPDU trigger (InterPDU_trig) and the Next Scheduled Event trigger and initiates the Transmit Trigger Command (Xmt_Trig_Cmd) to transmit state machine 52 to cause the next message to begin to be transmitted.

Communication controller 36 includes registers 60. These registers designated REG00-REG3F can be written to and read from by CPU 30. Interrupts (IRQs) are also handled through registers 60.

Clock generation circuitry 62 receives an external clock and either uses that clock or the clock signals from its internal oscillator 64 to generate all necessary clock signals for communication controller 36.

Clock generation circuitry 62 preferably has the capability of currently adjusting both its node timer and its octet timer clock rates. This allows communication controller 36 to synchronize the relationship of its Node Time with the Link Address Scheduler (LAS 20). Octet Time is used for internal message timing, while Node Time is used to share a common sense of time across fieldbus segment 12.

Timer 68 will be divided into two groups, representing different senses of time. A first set of timers called segment timers, operate based on a variable clock rate produced by clock generation circuitry 62 under software control from CPU 30. A second set of timers, called message timers, operates on a fixed rate clock.

There are two segment timers in communication controller 36. The first segment timer is a Node timer, which has a clock tick rate of 31.25 μsec (32 kHz). The Node timer is used to implement the Next Function Block Execution Time, Link Schedule Time V(LST), and Data Link Time (DL-Time).

The second segment timer is the Octet Timer, which has a clock tick rate of 2 μsec (500 kHz). The Octet Timer is used for the Next Scheduled Event trigger (which interfaces to transmit state machine 52 for transmitting messages at a specific time). When the clock rate is adjusted, the Node and Octet timers will track one another at the same rate. This is because the clock signals driving the Node timer and the Octet timer are derived from a common variable clock.

The message timers are started and stopped based upon fieldbus message events (transmit and receive). The message timers include an inactivity timer, an interPDU delay timer, a receive reply timer, a transmit reply timer, a delegated token recovery timer.

The inactivity timer is a decrementing counter. It is used for measuring the idle time between two PhPDUs. The inactivity timer works on both filtered and non-filtered received messages as well as any transmitted messages on fieldbus segment 12. When commanded to start, the inactivity timer will decrement every 16 μsec. The inactivity timer starting point is determined from a configurable preloaded set point loaded into one of registers 60. The decrementing of the inactivity timer can be cancelled or stopped via events that are related to either a received or transmitted message. If the timer ever reaches 0 or expires, an IRQ will be generated. The inactivity timer will remain at 0 until the IRQ is acknowledged. If the IRQ remains high, no additional message events that occur will effect the inactivity timer until this IRQ is acknowledged.

The interPDU delay timer is an incrementing counter. It is used in conjunction with a V(MID) threshold register to implement the fieldbus V(MID) minimum-interPDU delay that insures a minimum time duration (or gap time) of non-transmission between a transmitted or received message. The interPDU timer is affected by both filtered and non-filtered received messages as well as any transmitted messages on the fieldbus segment. When there is no fieldbus activity, the interPDU timer will continuously increment. Once the count value equals or exceeds a predetermined value stored in a register 60, the InterPDU_trig signal will go active. This signal is used for determining that the interPDU delay time has been met. This signal interfaces to xmtmngr 84 to give the command that a transmitted DLPDU can commence.

The receive reply timer is a decrementing counter. It is used to allow a subscribing device to monitor for an immediate response to a Compel Data (CD) DLPDU. It is also used for a device to monitor its own address when coming on line. When commanded to start, the receive reply timer will decrement every 16 μsec. The receive reply timer starting point is determined from a configurable preloaded 16-bit set point loaded into one of registers 60. The decrementing of the receive reply timer can be cancelled or stopped via either a SOM or SOT event. If the receive reply timer ever reaches 0 or expires, an IRQ will be generated. The receive reply timer requires that the IRQ be enabled for the IRQ to be generated. The receive reply timer will remain at 0 until the IRQ is acknowledged. If the IRQ remains high, no additional message events that occur will affect the receive reply timer until this IRQ is acknowledged.

The transmit reply timer is a decrementing counter. It allows a device to monitor for an immediate response after transmitting one of several DLPDUs (e.g., compel data, pass token). When commanded to start, the transmit reply timer will decrement every 16 μsec. The transmit reply timer starting point is determined from a configurable preloaded set point loaded into one of registers 60. The decrementing of the transmit reply timer can be cancelled or stopped via either a SOM event or SOT event of any transmitted DLPDU except that of a Probe Node (PN). If the transmit reply timer ever reaches 0 or expires, an IRQ will be generated. The transmit reply timer will remain at 0 until the IRQ is acknowledged. If the IRQ remains high, no additional message events that occur will affect the transmit reply timer until this IRQ is acknowledged.

The delegated token recovery timer is a decrementing counter. It is used for monitoring the idle time of receiving a delegated token from another device. The delegated token recovery timer works on both filtered and non-filtered received messages as well as any transmitted messages on fieldbus segment 12. When commanded to start, the delegated token recovery timer will decrement every 16 μsec. The delegated token recovery timer starting point is determined from a configurable preloaded set point loaded into one of registers 60. The decrementing of the delegated token recovery timer can be cancelled or stopped via events that are related to either a received or transmitted message. If the delegated token recovery timer ever reaches 0 or expires, an IRQ will be generated. The delegated token recovery timer will remain at 0 until this IRQ is acknowledged. If the IRQ remains high, no additional message events that may happen to occur will affect the delegated token recovery timer until this IRQ is acknowledged.

Discarding Partially Received Messages

Communications hardware is typically responsible for filtering messages received from a network and only passing those messages of interest on to software. Message filtering presents a special problem to the hardware, as the message filter may need to partially receive a message before deciding whether to filter the message. If the message filter decides to filter the message, the partially received message needs to be discarded. If the message filter decides to not filter the message, the hardware needs to pass the entire message to software, including the already partially received portion.

Figure 5:
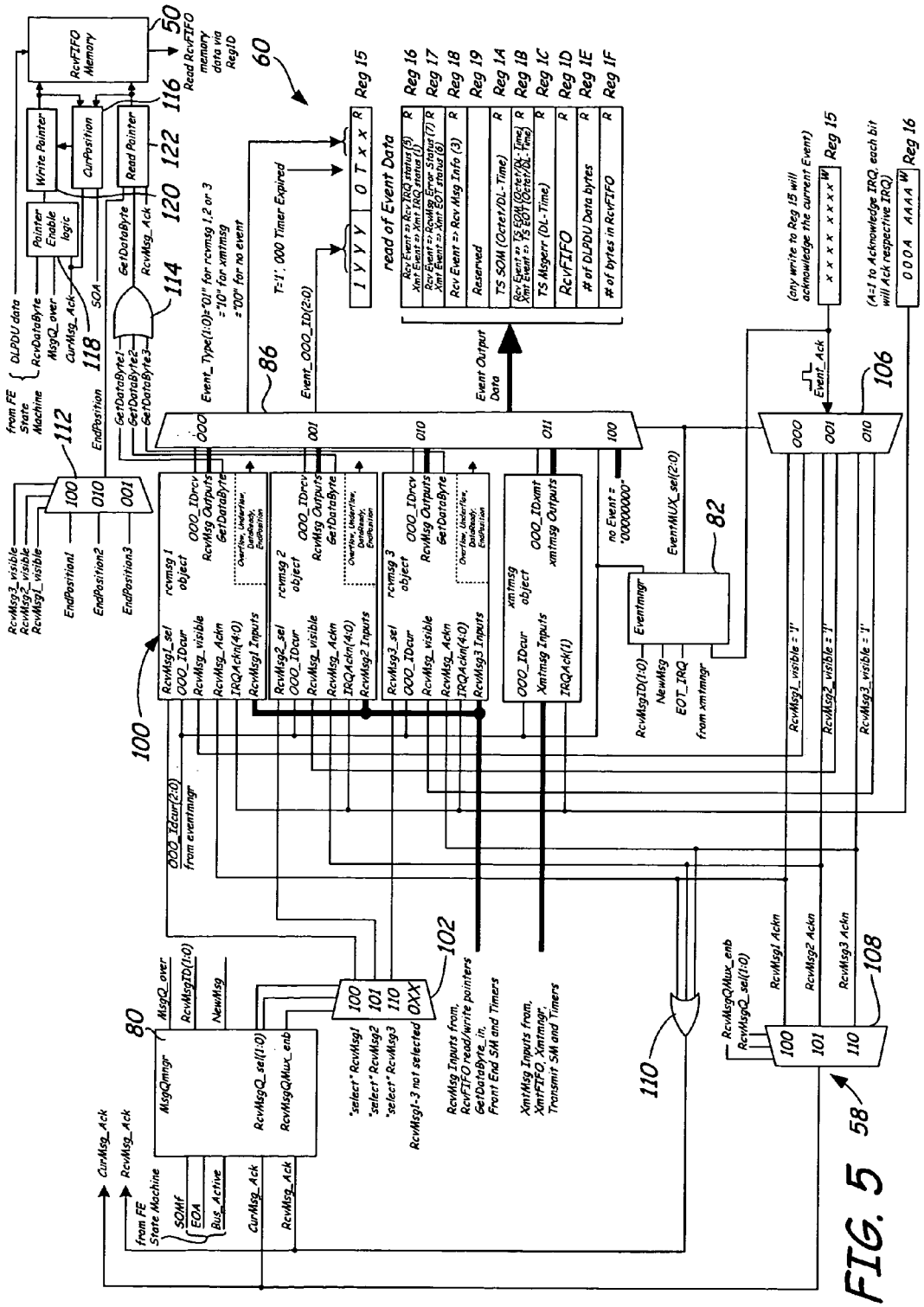
FIG. 5 is a functional block diagram of a receive/transmit event manager for processing data packets received on the communication medium segment.

FIG. 5 is a functional block diagram of receive/transmit event manager 58 for managing processing of data packets received by communication controller 36. Receive/transmit event manager 58 includes message queue manager (MsgQmngr) 80, event manager (EventMngr) 82, event MUX 86, received message object queue 100, and multiplexers 102, 106, 108, and 112. Received message object queue 100 includes storage space for three received message objects, labeled rcvmsg1, rcvmsg2, and rcvmsg3. Receive/transmit event manager 58 also includes current position pointer (CurPosition) 116, pointer enable logic 118, write pointer 120, and read pointer 122. Also shown in FIG. 5 are receive FIFO memory 50 and a portion (Reg15-Reg1F) of registers 60 for storing event data associated with received and transmitted message objects.

Receive/transmit event manager 58 allows CPU 30 to read in sequence the received message object (rcvmsg1, rcvmsg2, rcvmsg3) associated with each respective message that has occurred. Each received message object contains an assortment of message attributes, including message IRQs, error status, and general message information. The DLPDU data associated with a received message object is stored in receive FIFO memory 50.

The transmit message object (xmtmsg) accepts inputs from transmit manager (xmtmngr) 84, transmit state machine 52, transmit FIFO memory 54, and timer 68. From these inputs, CPU 30 can read the transmit IRQ, error status, and time stamp information in registers Reg16, Reg17 and Reg1B of registers 60. Xmtmngr 84, transmit FIFO memory 54, and transmit state machine 52, which are shown in receive/transmit event manager 58 in FIG. 4, are omitted from FIG. 5 for clarity since they are only associated with a transmitted message.

MsgQmngr 80 allows specific receive message events to be associated with the active received message from segment 12. This is controlled via MUX 102, which forms signals RcvMsg1_sel, RcvMsg2_sel, and RcvMsg3_sel. Only one of these select signals can be active at a time. Thus, only one received message object (rcvmsg1, rcvmsg2, rcvmsg3) will have receive events associated with it while the message is active. Several inputs are ported into received message object queue 100. These signals include the current position value of read pointer 122, write pointer 120, GetDataByte_in (for reading RcvFIFO), signals from front end state machine 46, and current time values from timers 68. The three select signals (RcvMsg1_sel, RcvMsg2_sel, and RcvMsg3_sel) allows the input signals to be properly associated with only one received message object.

If an EOA event pulse occurs after a received message while there are still three unacknowledged received message objects in received message object queue 100, MsgQmngr 80 disables the fourth message from being received by forcing the RcvMsgQMux_enb signal low (inactive). A MsgQ_over signal is also passed to pointer enable logic 118. This prevents a fourth received message from corrupting the DLPDU data in receive FIFO memory 50. To re-enable the RcvMsgQMux_enb signal, CPU 30 must acknowledge the first received message object to occur (i.e., the oldest message to occur time wise). CPU 30 writes to register Reg15 in registers 60, which generates the Event_Ack signal (event acknowledge), and consequently creates the RcvMsg_Ack signal from the output of OR gate 110.

EventMngr 82 controls selection of event MUX 86 to multiplex in the reading of one of the three received message objects (rcvmsg1, rcvmsg2, rcvmsg3) or the transmit message object (xmtmsg). The received message object for an active message is available for CPU 30 to read via registers Reg15 to Reg1F of registers 60. CPU 30 reads the lower two bits of register Reg15 to determine whether the next event to be processed is a received message ("01"), a transmitted message ("10"), or if there is no event to process ("00"). For a received message, MUX 106 form six signals: RcvMsg1_visible, RcvMsg2_visible, RcvMsg3_visible, RcvMsg1_Ackn, RcvMsg2_Ackn, and RcvMsg3_Ackn. The former three signals are mutually exclusive and select which of the three received message objects is to be passed through event MUX 86 for processing by CPU 30. Thus, the associated event information and attribute data for only one received message object can be processed at a time. The events are processed in the same sequence as they are received from segment 12.

Signals RcvMsg1_Ackn, RcvMsg2_Ackn, and RcvMsg3_Ackn are used to acknowledge the currently visible received message object after all event data has been processed by CPU 30. These three signals are supplied as inputs to OR gate 110, and a RcvMsg_Ack signal is produced at the output of OR gate 110. The RcvMsg_Ack signal is supplied as an input to MsgQmngr 80 and read pointer 122.

MsgQmngr 80 also controls MUX 108, which is used to create the signal CurMsg_Ack (current message acknowledge). The "current message" is the active receive message on segment 12 for which CPU 30 is processing event data (i.e., the message visible to CPU 30). CurMsg_Ack is used by MsgQmngr 80, and controls write pointer 120 (through pointer enable logic 118) and CurPosition 116. CurMsg_Ack is active when a received message object is visible and the corresponding select signal for the received message object is active (e.g., RcvMsg1_visible=RcvMsg1_sel=1).

CPU 30 interfaces with read pointer 122 to receive FIFO memory 50 via the GetDataByte_in signal. CPU can only access read pointer 122 through the received message object that is currently visible to CPU 30 for reading (i.e., the RcvMsg_visible signal is active for the received message object). When CPU 30 is ready to read the stored DLPDU data from receive FIFO memory 50, software in CPU 30 generates a GetDataByte_in command via register Reg1D of registers 60. Any read from register Reg1D of registers 60 places the data from receive FIFO memory 50 immediately onto the data bus for reading by CPU 30. The GetDataByte_in signal is ported to all three received message objects, but only one of the three received message objects is readable (or visible) to CPU 30 at a time. The EventMUX_sel(2:0) signal selects the current visible received message object for CPU 30 to read via MUX 106. For example, if RcvMsg1_visible is active, the GetDataByte1 signal is generated through received message object rcvmsg1. GetDataByte1, GetDataByte2, and GetDataByte3 are supplied as inputs to OR gate 114, the output of which is a global GetDataByte signal. When the global GetDataByte signal is activated, read pointer 122 of receive FIFO memory 50 is incremented one position. As read operations are performed from rcvmsg1, read pointer 122 is compared with the EndPosition value of rcvmsg1. This allows CPU 30 to know the number of bytes in receive FIFO memory 50 for the message associated with rcvmsg1.

Front end state machine 46 decodes the serial data stream, and converts it to an 8-bit parallel formatted byte. After the formation of the byte, front end state machine 46 creates a write pulse (via RcvDataByte) that stores the decoded data into the location in receive FIFO memory 50 that is pointed to by write pointer 120. The write pulse increments write pointer 120 to prepare for the next DLPDU byte to be written. As the DLPDU data of an active receive message is being written into receive FIFO memory 50, the current value of the write pointer in receive FIFO memory 50 is continuously transferred to the EndPosition value of the corresponding received message object. Since the DLPDU data is added to receive FIFO memory 50 in the same order as received message objects are added to received message object queue 100, a consistent ordering is maintained between receive FIFO memory 50 and received message object queue 100.

The data stored in receive FIFO memory 50 contains the DLPDU data for up to three complete received message objects (up to 63 bytes). Each received message object contains registers for storing several attributes readable by software that pertain to the reception state of the active received message (as selected by MsgQmngr 80). These attributes include Overflow, Underflow, DataReady, end position (EndPosition) of the message, and an active flag.

Overflow is a Boolean attribute that, when set, indicates that an overflow condition of receive FIFO memory 50 occurred while storing DLPDU data from a received message from segment 12. If receive FIFO memory 50 fills up before DLPDU data is read from receive FIFO memory 50 by CPU 30, receive FIFO memory 50 activates a signal to all received message objects, indicating that an overflow condition has occurred. This will prevent further data from being written to receive FIFO memory 50 until at least one DLPDU data byte is read from receive FIFO memory 50. When an overflow condition occurs, the Overflow attribute is set for the received message object that is visible. When a received message object with the Overflow attribute set is visible to CPU 30 to read, the Overflow attribute is read and processed by CPU 30. CPU 30 acknowledges the set Overflow attribute (and subsequently clears the Overflow attribute) by writing to the appropriate bit of register Reg16.

Underflow is a Boolean attribute that indicates that the last attempt to read from receive FIFO memory 50 failed due to a lack of data. This occurs when CPU 30 attempts to generate a GetDataByte_in signal when receive FIFO memory 50 is empty (i.e., no DLPDU bytes to read). If this occurs, read pointer 122 will not be incremented, thus maintaining proper positioning of read pointer 122. When an underflow condition occurs, the Underflow attribute is set for the received message object that is visible. CPU 30 acknowledges the set Underflow attribute (and subsequently clears the Underflow attribute) by writing to the appropriate bit of register Reg16.

For all received messages, while data is transferred from front end state machine 46 for writing to receive FIFO memory 50, receive FIFO memory 50 continuously monitors whether it is approaching its 63-byte storage limit. DataReady is a configurable Boolean attribute that indicates that receive FIFO memory 50 is approaching a full state and needs to be read soon by CPU 30 to prevent an overflow condition of receive FIFO memory 50. If the number of unread DLPDU data bytes in receive FIFO memory 50 is equal to or greater than the DataReady threshold value, an IRQ is generated in the received message object that is active. When the received message object is visible for CPU 30 to read, the DataReady attribute can then be read and processed by CPU 30. CPU 30 acknowledges the set DataReady attribute (and subsequently clears the DataReady attribute) by writing to the appropriate bit of register Reg16.

EndPosition is an integer attribute that stores the position of write pointer 120 of receive FIFO memory 50 as DLPDU data is being written for the currently active message. The EndPosition attribute of the currently active received message object is continuously updated as write pointer 120 is incremented. As DLPDU data bytes are read from receive FIFO memory 50, read pointer 122 is incremented. When the value of read pointer 122 equals the EndPosition value, no further data is stored in receive FIFO memory 50 for the currently visible received message object. When no data is available for the visible received message object, an empty flag is set to prevent CPU 30 from generating the GetDataByte output of the visible received message object. This helps maintain proper positioning of read pointer 122 and DLPDU data association integrity. The EndPosition attribute of each received message object provides an input to MUX 112, and the value of the EndPosition attribute for the visible received message object is passed to read pointer 122.

The active flag is a Boolean attribute that indicates that the received message object being processed by CPU 30 (i.e., the visible received message object) is also selected (via signal RcvMsg_sel). When EOA is detected for a received message, the active flag returns to low. When a message is received from segment 12, the currently selected received message object has its associated message attributes updated within. For example, if there is no DLPDU data contained in receive FIFO memory 50 when MAU 38 receives a message, signal RcvMsg1_sel is set by MsgQmngr 80, thereby activating the active flag attribute in receive message object rcvmsg1. While the active flag is set for a received message object, the current position of write pointer 120 is stored in the EndPosition attribute of the selected received message object.

For certain received messages, CPU 30 may determine whether it is necessary to process an entire message before all of the DLPDU data for the message has been stored into receive FIFO memory 50. For example, assume a 20-byte message on segment 12 is in the process of being received, and received message object rcvmsg1 is selected (RcvMsg1_sel=1) and is visible (RcvMsg1_visible=1). After a few DLPDU bytes have been written to receive FIFO memory 50, CPU 30 can read register Reg1F and determine the number of DLPDU bytes for rcvmsg1 that have been written to receive FIFO memory 50. The value read from register Reg1F is a comparison of the value of the EndPosition attribute of rcvmsg1 with the value of read pointer 122. CPU 30 may then read the partial message stored in receive FIFO memory 50 via register Reg1D. From this partial message, CPU 30 may determine that the remaining bytes do not need to be processed, and the remaining portion of the message can be discarded (i.e., filtered). At this point, CPU 30 initiates the Event_Ack signal by performing a write operation to register Reg15. The Event_Ack signal generates the CurMsg_Ack signal through MUX 108.

The initiation of the Event_Ack signal causes a sequence of events to occur to prepare receive FIFO memory 50 for a next received message. First, when the CurMsg_Ack signal is generated, signal RcvMsgQMux_enb will be disabled by MsgQmngr 80. When RcvMsgQ_enb is low, any additional events that occur at the inputs of the active received message object will be ignored. CPU 30 saves processing time reading the remaining portion of the received message, allowing CPU 30 to perform other processing in device 24. The attribute states (e.g., Overflow, Underflow, etc.) that are set for the active received message object are then cleared by the corresponding RcvMsg_Ackn signal (e.g., RcvMsg1_Ackn for received message object rcvmsg1). Subsequently, the CurMsg_Ack signal disables pointer enable logic 118, which controls the incrementing of write pointer 120 to receive FIFO memory 50. This action prevents any additional DLPDU bytes of the active receive message associated with the active received message object from being written into receive FIFO memory 50. The remaining DLPDU data is decoded by front end state machine 46, but is not stored. The CurMsg_Ack signal also causes the current value of CurPosition 116 to be copied to write pointer 120. The RcvMsg_Ack signal (output from OR gate 110) initiates sampling of the EndPosition value of the active received message object out of MUX 112 (e.g., EndPosition1 for received message object rcvmsg1), and subsequently initiates copying of the sampled value of EndPosition to read pointer 122. Consequently, write pointer 120 and read pointer 122 are repositioned to the same value.

When an end of activity (EOA) event pulse occurs for the partially received discarded message, the RcvMsg_sel signal for the next received message object in received message object queue 100 becomes active. When a new message is received on segment 12, it is written into receive FIFO memory 50. The first byte of DLPDU data for the next received message object is stored at the new repositioned value of write pointer 120. As a result, the partially received portion of the discarded message is overwritten by the new message.

In summary, message filtering presents a special problem to the hardware, as the message filter may need to partially receive a message before deciding whether to filter the message. If the software message filtering decides to filter the remaining portion of the message, the partially received message needs to be discarded. The present invention is a system and method for discarding a partially received message from a received data memory. When a message is received, a received message object is activated, and the current position of write pointer 120 in the received data memory is tracked and stored in the active received message object. The received message is then written to receive FIFO memory 50 starting at the initial position of write pointer 120. As the message is written to received FIFO memory 50, the position of write pointer 120 is incremented. If CPU 30 determines that the message is to be ignored, the active received message object is disabled, thereby ignoring the remaining events associated with the message. Furthermore, the received data memory is disabled, thereby preventing further writing of the DLPDU data associated with the ignored message to receive FIFO memory 50. When the message is ignored, read pointer 122 is positioned in received FIFO memory 50 at the point when CPU 30 decided to filter the remaining message. Write pointer 120 is then preferably repositioned to the same position in receive FIFO memory 50 as read pointer 122.

By allowing software to ignore a message before all DLPDU data has been received for the message, valuable processing time for CPU 30 is saved. Furthermore, since receive FIFO memory 50 may contain DLPDU data for up to three received message objects, it is important to have hardware properly keep track and control of the positioning of write pointer 120 and read pointer 122 to maintain the association of DLPDU data with the appropriate received message object. The importance of correct alignment of write pointer 120 and read pointer 122 becomes even more apparent in situations where CPU processing time is even more crucial, such as when received messages with a large amount of DLPDU data associated with it are discarded, or in a CPU operating at lower clock frequencies for low power applications.

Although the present invention has been described with reference to preferred embodiments, workers skilled in the art will recognize the changes may be made in form and detail without departing from the spirit and scope of the invention.

The invention claimed is:

1. A device for communicating over a communication medium, the device comprising:
   a medium attachment unit (MAU) for receiving and transmitting messages on the communication medium;
   a central processing unit (CPU) for processing data contained in messages received and creating data to be contained in messages to be transmitted;
   a communication controller for interfacing between the MAU and the CPU, the communication controller including a data queue and a queue of received message objects, the data queue for storing a plurality of messages received on the communication medium, each received message object corresponding to a message stored in the data queue, wherein read/write operations to the data queue are maintained by a write pointer, a read pointer, and a current position pointer;
   wherein before receipt of a message on the communication medium, a first received message object is activated to permit the message to be stored in the data queue, wherein upon message object activation an initial position of the write pointer is stored to the current position pointer, wherein the write pointer is incremented as data is written to the data queue;
   wherein the device determines, before the receipt of the message is complete, whether the message is to be discarded from the data queue and if the message is to be discarded, the first received message object is deactivated to prevent the message from being further stored in the data queue; and
   wherein the data queue write pointer is restored to the initial position stored by the current position pointer is the message if to be discarded.

2. The device of claim 1, wherein an active flag is set to activate a received message object and cleared to deactivate the received message object.

3. The device of claim 1, wherein a second received message object is activated when an End of Activity signal is received for the message.

4. The device of claim 1, wherein the data queue is stored in a ring buffer.

5. A method of filtering a message in a communication device before the entire message is received, the method comprising:
enabling a first received message object before receipt of the message;
storing in a current position pointer an initial position of a write pointer in a received data memory;
writing the message to the received data memory starting at the initial position of the write pointer;
incrementing a position of the write pointer as the message is written to the received data memory;
disabling the first received message object before receipt of the message in the received data memory is complete when the communication device determines that the message is to be discarded to prevent the message from being further stored in the received data memory; and
returning the write pointer to the initial position stored by the current position pointer if the first received message object is disabled before receipt of the message is complete.

6. The method of claim 5, wherein the first received message object is enabled upon receipt of a Start of Activity signal from the message.

7. The method of claim 5, further including:
reading the message stored to the received data memory by incrementing a read pointer; and
setting the value of the read pointer equal to the value of the write pointer, after the write pointer has been returned to the initial position, if the first received message object is disabled before receipt of the message is complete to ensure the read pointer and the write pointer point at the same location after the partially received message is discarded.

8. The method of claim 5, further comprising:
enabling a second received message object when an End of Activity signal is received for the message.

9. The method of claim 5, wherein enabling the first received message object comprises setting an active flag of the first available received message object.

10. The method of claim 5, wherein disabling the first received message object comprises unsetting an active flag of the first available received message object.

11. A method of removing a partially received message from a data queue in a communication device, the data queue for storing a plurality of messages received on a communication medium, the method comprising:
activating an active data object before receipt of a message on the communication medium:
storing an initial position of a data queue write pointer to a current position pointer before receiving any portion of the message;
writing the received message to the data queue starting at the initial position of the write pointer;
incrementing a position of the write pointer as the received message is written to the data queue;
determining, before receipt of the message to the data queue is complete, whether the message is to be discarded;
deactivating the active data object if the message is to be discarded to prevent further storage of the message in the data queue; and
returning the write pointer to the initial position stored by the current position pointer if the active data object is deactivated before receipt of the message is complete such that a next message received by the communication device overwrites the received message, wherein the data queue write pointer is returned to the initial position.

* * * * *